(No Model.)
F. MUTIMER.
PROCESS OF MANUFACTURING BOLTS.
No. 376,673. Patented Jan. 17, 1888.
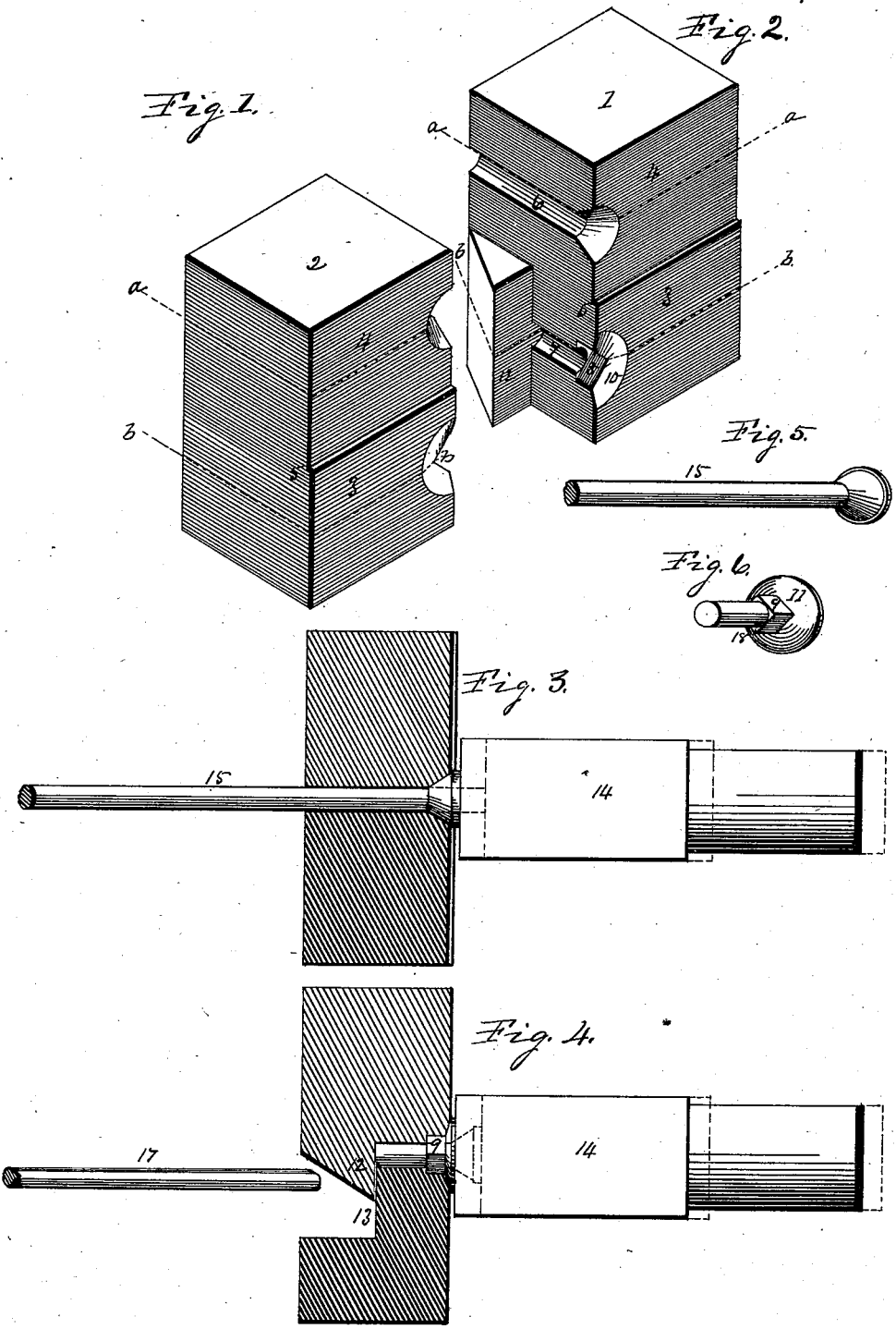

UNITED STATES PATENT OFFICE.

FREDERICK MUTIMER, OF ROCKFORD, ILLINOIS, ASSIGNOR OF ONE-HALF TO THE ROCKFORD BOLT WORKS, OF SAME PLACE.

PROCESS OF MANUFACTURING BOLTS.

SPECIFICATION forming part of Letters Patent No. 376,673, dated January 17, 1888.

Application filed September 21, 1887. Serial No. 250,321. (No model.)

*To all whom it may concern:*

Be it known that I, FREDERICK MUTIMER, a citizen of the United States, residing in the city of Rockford, county of Winnebago, and State of Illinois, have invented new and useful Improvements in the Process of the Manufacture of Bolts, of which the following is a specification.

This invention relates to the manufacture of bolt-blanks having heads of large dimensions in proportion to the diameter of the shaft to be screw-threaded.

In the manufacture of bolt-blanks from bar material it is found impractical to upset or compress more in length of the bar than about twice its diameter at a single operation. This arises from the fact that if more in length of the bar than about twice its diameter is subjected to endwise compression in a single operation it is liable to bend or kink and form an imperfect head.

Heretofore, so far as known to me, bolt-blanks having large heads in proportion to the diameter of the shaft of the blank have been made from blanks first cut to the required length from bars of the required diameter, and then heated and headed at one or more operations in even-faced dies, in which the first compression or upsetting of the blank would thin the edges of the head portion, which caused the thin edges to cool to such an extent that in the second operation without reheating to complete the blank its edge portions would crack open and form a broken ragged outer edge, which required grinding, turning, or milling or other equivalent operation to produce a finished blank.

To obviate the foregoing difficulties and produce bolt-blanks cut from the bar to the required length and finished in uniform length without reheating is the object of this invention, and to this end I have matured the following process, which consists in properly heating an end portion of a metallic rod or bar from which to make the bolt-blank, subjecting a proper portion of the heated end of the bar to endwise pressure in suitable dies to upset a portion of the bar to accumulate a portion of the material necessary in the formation of the head of the blank, in subjecting the upset end portion of the bar to cutters in suitable dies to separate from the upset portion of the bar the required length, and in the same operation subject its upset-end portion to a second end pressure in the dies to form the neck and head of the blank without reheating, which completes the process.

As one means of carrying out my improved process in the manufacture of bolt-blanks, I employ the apparatus represented in the accompanying drawings, in which—

Figures 1 and 2 are representations in isometrical of a two-part clamping-die. Fig. 3 is a section on dotted line *a* on Figs. 1 and 2. Fig. 4 is a section on dotted line *b* on Figs. 1 and 2. Fig. 5 is an isometrical representation of the rod from which to make the bolt-blank after the first compression of its end portion, and Fig. 6 is an isometrical representation of the finished bolt blank after the second compression.

The bolt-heading dies represented in the accompanying drawings, corresponding to the foregoing figure-numbers, are in every particular identical with like parts of the bolt-heading dies shown and described in my application for improvement in bolt-heading dies, executed by me September 1, 1887, and now pending before the United States Patent Office.

The two portions 1 and 2 of the dies are made with a lower portion, 3, and a reduced upper portion, 4, forming a shoulder, 5, about the center of their height on the face of the dies on which the heads of the bolt-blanks are formed. Semicircular grooves 6 and 7 are formed in the face of their meeting edges opposite each other and are of a diameter to snugly embrace the bar from which the bolt-blank is to be made to hold it against the action of the plunger. The end of the groove 6, opening on the heading-face of the upper portion of the dies, is preferably of a countersink form, into which the end portion of the bar is compressed by the first action of the dies and plunger, and the end of the groove 7, opening on the heading-face of the lower portion of the dies, is of a conformation to give the required form to the head and neck of the bolt-blanks when the bar is compressed in the second action of the dies and plunger. In this instance the end portion of the groove 7 consists of a section, 8, rectangular in cross-section when the dies are closed to give conformation to the neck 9 of the blank, and an outer concave section, 10, to give conformation to the under face of the head 11, which is of disk form with under face slightly convex.

A cutter, 12, projects from the lower rear portion of the meeting face of the die 1 in position to enter a recess, 13, formed in the lower rear corner and meeting face of the die 2, and in the closing movements of the dies cuts the bolt-blank from the bar, and serves as a stop to the blank to resist the action of the plunger in forming the head of the blank, and the distance from the heading-face of the dies to the cutter determines the length of the finished bolt-blanks, which will be substantially identical in length.

The plunger 14, employed to compress the end of the bar into the dies, is of a width about equal to the height of the dies, and its compression-face is a plain even surface to form the outer face of the head of the bolt-blank.

The dies 1 and 2 and the plunger 14 are designed for use in machines now in use in the manufacture of bolts, and their outside dimensions are such as to enter the die-seat of the particular machine in which they are intended to be used, and their reciprocating movements toward and from each other are such as to freely admit the insertion of the bar from which the blanks are to be made and to grasp and hold it firmly against the action of the plunger.

In the employment of the foregoing-described dies as a means for carrying out my improved process in the manufacture of bolt-blanks having a head of large dimensions in proportion to the shaft of the blank, the heated end portion of the rod or bar 15, from which the bolt-blank is to be made, is placed in the groove 6 in the recessed portion of the dies, with its end abutting against the face of the plunger to gage the length of the bar to be upset, as shown in the dotted lines in Fig. 3, and the closing of the dies will compress the end portion of the bar into the die, as therein shown and as seen at 16, Fig. 5, removed from the dies, leaving the edge portions of the compressed end of a thickness to retain heat sufficient to prevent its edges cracking in the second operation.

On the opening of the dies the bar is removed from the groove 6 and is placed in groove 7 with its compressed end against the face of the plunger to gage the length of the end portion of the bar 17 to be upset, as shown in Fig. 4, and the second closing of the dies will cut the blank from the bar to the required length, and the action of the plunger will compress its end portion into the dies to give conformation to the neck and head of the blank, as therein shown, and upon the opening of the dies after the second compression the finished blank 18 will drop from the dies.

In the foregoing I have given my improved process in connection with the manufacture of a particular form of bolt-blank; but evidently my improved process is applicable to the manufacture of bolt-blanks of most, or perhaps all, varieties requiring more than a single operation to produce finished bolt-blanks uniform in length; but for the purpose of manufacturing bolt-blanks having heads of some of the known varieties the dies and perhaps the plunger would require a particular conformation to produce the required variety; but such changes would not in any manner materially change my improved process.

I claim as my invention—

The herein-described process in the manufacture of bolt-blanks, consisting of heating the end of the bar from which to make the bolt-blank, subjecting its heated portion to endwise pressure in suitable dies, thereby accumulating material in a form to retain heat for a second endwise compression, and cutting the heated compressed end portion of the bar to the required length and subjecting it to a second compression in suitable dies in one operation to complete the blank, substantially as and for the purpose set forth.

FREDERICK MUTIMER.

Witnesses:
C. R. WISE,
A. O. BEHEL.